(12) United States Patent
Banks et al.

(10) Patent No.: US 7,765,127 B2
(45) Date of Patent: Jul. 27, 2010

(54) SYSTEM FOR PROCESSING PRODUCT INFORMATION IN SUPPORT OF COMMERCIAL TRANSACTIONS

(75) Inventors: William A. Banks, Phoenixville, PA (US); Morgan L. Pape, Flourtown, PA (US); Luis Castillo, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 2682 days.

(21) Appl. No.: 10/007,105

(22) Filed: Dec. 4, 2001

(65) Prior Publication Data

US 2002/0161672 A1 Oct. 31, 2002

Related U.S. Application Data

(60) Provisional application No. 60/286,387, filed on Apr. 25, 2001.

(51) Int. Cl.
*G06Q 30/00* (2006.01)
(52) U.S. Cl. .................... 705/26; 705/27; 709/835; 235/378
(58) Field of Classification Search ............... 705/26
See application file for complete search history.

(56) References Cited

U.S. PATENT DOCUMENTS

| | | | |
|---|---|---|---|
| 5,638,519 A | 6/1997 | Haluska | 395/228 |
| 5,694,551 A | 12/1997 | Doyle et al. | 395/226 |
| 5,870,717 A | 2/1999 | Wiecha | 705/26 |
| 5,918,212 A | 6/1999 | Goodwin, III | 705/20 |
| 6,076,071 A | 6/2000 | Freeny, Jr. | 705/26 |

(Continued)

FOREIGN PATENT DOCUMENTS

WO   WO 00/68859   11/2000

(Continued)

OTHER PUBLICATIONS

GHX products "The MemberSource Exchange Platform," http://www.ghx.com/corpweb/cdanew/common/c . . . /.

(Continued)

*Primary Examiner*—F. Zeender
*Assistant Examiner*—Luna Champagne (57) ABSTRACT

A system supporting commercial transactions synchronizes e-Catalog data from any e-catalog into a users ERP system. A system for processing product information for supporting commercial transactions involves a first database for maintaining product information including product description, product vendor and associated product pricing information. A data processor in the system receives product information and updates the first database information to incorporate received product information in response to detection of matching records between the received product information and the first database information. A display processor initiates display of updated product information in response to user command. Further, a catalog system maintains and processes a catalog of product information supporting commercial transactions and includes a bidirectional communication processor supporting communication with a remote application. The system also includes a catalog database for maintaining product information including product description, product vendor and associated product pricing information. A catalog data processor employs the communication processor in receiving product usage information from a remote application, identifying differences between data in the received product usage information and the catalog database product information, and communicating product information to the remote application in response to the identified differences.

25 Claims, 5 Drawing Sheets

U.S. PATENT DOCUMENTS

| | | | |
|---|---|---|---|
| 6,115,641 A | 9/2000 | Brown et al. | 700/102 |
| 6,523,027 B1* | 2/2003 | Underwood | 707/4 |
| 2003/0093414 A1* | 5/2003 | Litzow et al. | 707/3 |

FOREIGN PATENT DOCUMENTS

| | | |
|---|---|---|
| WO | WO 01/08034 | 2/2001 |
| WO | WO 01/18727 | 3/2001 |

OTHER PUBLICATIONS

832 Price/Sales Catalog Functional Group ID=SC EDI Compatible Price Sales Catalog Standard.

850 Purchase Order Functional ID=PO EDI Compatible Purchase Order Standard.

European Search Report.

* cited by examiner

| DATA FIELD |
|---|
| MANUFACTURER CODE — 405 |
| MANUF. PART NUMBER — 407 |
| MANUFACTURER NAME — 409 |
| SUPPLIER CODE — 411 |
| SUPPLIER PART NUM — 413 |
| SUPPLIER NAME — 415 |
| CONTRACT NUMBER — 417 |
| CONTRACT NAME — 419 |
| UPN — 421 |
| NDC — 423 |
| ITEM DESCRIPTION — 425 |
| UOM — 427 |
| PRICE — 429 |

FIG. 4

| DATA FIELD |
|---|
| 505 — PO NUMBER |
| 507 — LINE NUMBER |
| 415 — SUPPLIER NAME |
| 509 — SUPPLIER ID |
| 511 — BUYER NAME |
| 515 — PROCUREMENT ITEM NUMBER |
| 413 — SUPPLIER PART NUMBER |
| 405 — MANUFACTURER CODE |
| 407 — MANUFACTURER PART NUMBER |
| 423 — NDC NUMBER |
| 517 — QUANTITY ORDERED |
| 519 — RECEIVED QUANTITY |
| 521 — APPROVED QUANTITY |
| 523 — LINE ITEM UNIT OF MEASURE |
| 525 — LINE ITEM UNIT PRICE |
| 529 — LINE ITEM TOTAL AMOUNT |

FIG. 5

SYSTEM FOR PROCESSING PRODUCT INFORMATION IN SUPPORT OF COMMERCIAL TRANSACTIONS

This is a non-provisional application of provisional application ser. No. 60/286,387 by W. A. Banks et al. filed Apr. 25, 2001.

FIELD OF THE INVENTION

This invention concerns a system for processing product information including product price, description and supplier information held in one or more databases in support of commercial transactions such as product purchasing, procurement or billing.

BACKGROUND OF THE INVENTION

With the advent of e-procurement systems, users can potentially improve their purchasing processes by using these systems to compare product information, verify pricing and availability, and streamline supply chains. Users, however, are restricted from purchasing through these systems because of purchasing controls implemented by their information technology systems.

In the healthcare area, for example, a Materials Management system is typically a core application used by healthcare (and other) purchasing managers and materials decision-makers to order medical and related supplies. Users have often invested considerable amounts of time and money into implementing complex Enterprise Resource Planning (ERP) systems that support the organizations standard purchasing processes. Currently, ERP systems do not readily facilitate purchase or other commercial transactions involving entities outside the ERP system. Transactions involving such external entities may employ e-procurement systems that do not have accurate product information such as price, description and vendor information. This presents a number of problems. A system according to invention principles addresses these problems and derivative problems

SUMMARY OF INVENTION

A system supporting commercial transactions synchronizes e-Catalog data from any e-catalog system into a users ERP system and reduces "rogue" buying practices that lead to purchases of off-contract items with incorrect pricing. A system for processing product information for supporting commercial transactions involves a first database for maintaining product information including product description, product vendor and associated product pricing information. A data processor in the system receives product information and updates the first database information to incorporate received product information in response to detection of matching records between the received product information and the first database information. An interface processor communicates updated product information to a device in response to user command.

A catalog system maintains and processes a catalog of product information supporting commercial transactions and includes a bidirectional communication processor supporting communication with a remote application. The system also includes a catalog database for maintaining product information including product description, product vendor and associated product pricing information. A catalog data processor employs the communication processor in receiving product usage information from a remote application, identifying differences between data in the received product usage information and the catalog database product information, and communicating product information to the remote application in response to the identified differences.

DETAILED DESCRIPTION OF PREFERRED EMBODIMENTS

Figure 1:
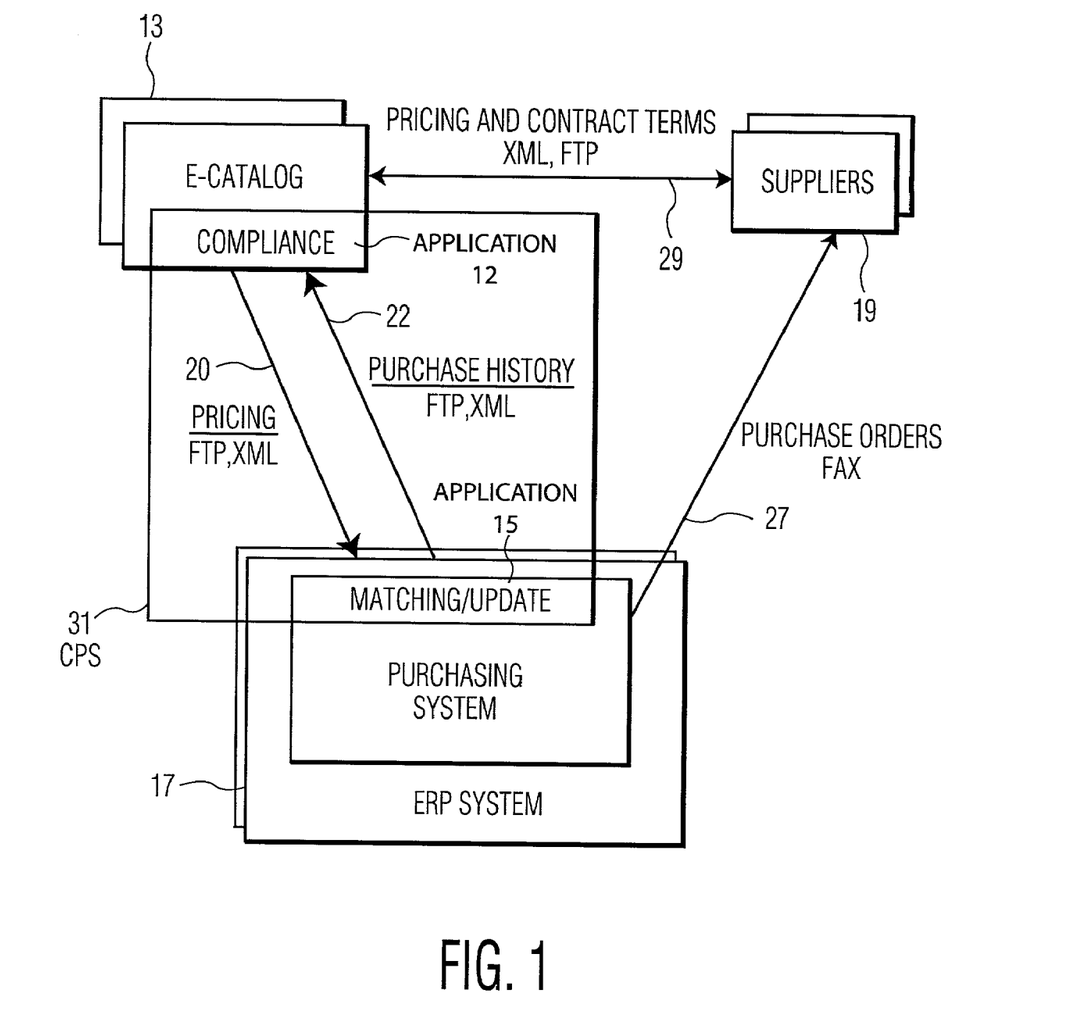
FIG. 1 shows a system including a purchasing database and catalog database for processing product information for supporting commercial transactions, according to invention principles.

FIG. 1 shows a system including a purchasing database and catalog database for processing product information for supporting commercial transactions. The system advantageously provides the capability of integrating and continuously maintaining item pricing from an e-Catalog system to an organization's purchasing database system such as an Enterprise Resource Planning (ERP) system including a Material Management Information System (MMIS), for example. The system advantageously automates the synchronization of inventory items and consistently maintains accurate item pricing. In addition, the system provides the purchase history transactions that allow e-Catalog systems to re-calculate pricing based on volume discounts or tiered pricing contracts and facilitates contract compliance reporting requirements. The system also synchronizes e-Catalog data from e-Catalog systems into a users Enterprise Resource Planning (ERP) system to reduce "rogue" buying practices that lead to purchases of off-contract items with incorrect pricing. The system also enables e-procurement systems to send catalog and pricing updates to a Materials Management System. Thereby purchase orders sent to suppliers contain accurate pricing, eliminating the need for buyers to continually maintain item pricing and greatly reduce the number of invoice matching errors. Further, the integration of e-Procurement catalogs with an ERP system advantageously supports an ERP system in the scheduling of purchasing tasks and in associated control operations. This synchronization provides process efficiencies and eliminates multiple buyer centers, systems and staff.

The inventors have recognized that an ERP system does a good job of managing purchase orders but the accuracy of the data that goes on a purchase order, for example, is dependent on the accuracy of user data entry. In contrast, e-Catalog data is maintained by the owner of the data and by vendors setting product pricing. Therefore e-Catalog data tends to be inherently relatively accurate. Purchasing through these e-procurement systems has hitherto essentially been limited by corporate business practices imposed by an ERP system. The disclosed system capitalizes on the advantages yielded by an e-catalog system and its central repository of product information from multiple suppliers, GPO's (Group Purchasing Organizations) and users. An e-catalog system provides consolidated product information into one or more locations where all parties can collaborate to maintain accurate pricing. By providing this data to a purchasing system that generates the purchase orders minimizes pricing errors and invoice errors.

FIG. 1 describes the interaction between e-Catalog vendors 13, Suppliers 19, and ERP Purchasing System 17. The interaction involves communication of records between the e-Catalog vendors 13, Suppliers 19, and Purchasing System 17. The term record is used herein to signify information used by the functions of the FIG. 1 system in supporting commercial transactions and that are preserved in non-volatile, permanent or tangible form such as in a computer file, disk, CDROM, DVD etc. or other electronic storage and are accessible by a computer or other electronic processing system. Item 31, that intersects e-catalog vendor and purchasing systems 13 and 17 respectively, depicts a Continuous Price Synchronization (CPS) system according to invention principles. The e-Catalog vendor unit 13 consolidates product information from multiple suppliers and maintains current product pricing.

The e-Catalog vendor unit 13 also maintains web sites through which Users (typically those users that do not have their own MMIS systems) are able to purchase products usually at the expense of a transaction fee. Such Users typically perform manual maintenance of any internal purchasing system they operate to reflect data acquired in purchasing via an e-Catalog system. Users that operate MMIS purchasing systems or other simpler purchasing database systems typically purchase supplies directly from the suppliers through the generation of a purchase order from these MMIS purchasing or other purchasing systems. The accuracy of the pricing that is contained within a purchase order is dependent on the values maintained within the user system. Often these values change without the knowledge of the user and result in price discrepancies between a generated purchasing order and a corresponding received invoice. In contrast, the system of FIG. 1 employs Continuous Price Synchronization (CPS) system 31 that maintains accurate prices from multiple suppliers and automates the integration of this information into the purchasing system thereby purchase orders that are generated contain correct prices and reduce invoice discrepancies.

Although the system is described in connection with a specific healthcare embodiment, this is exemplary only. Implementation of the system may differ for each MMIS system involved and the inventive principles apply to any purchasing system vulnerable to inaccurate pricing information resulting in price discrepancies between vendors and purchasers. Product information synchronization between an e-catalog and a purchasing database may involve manual steps (e.g., for user approval or item search or matching) or may be automatic or may be a combination of the two. In the described embodiment product information matching and price update involves update of internal files using a combination of manual and automatic steps.

In the FIG. 1 arrangement, the continuous price synchronization system 31 includes applications operating in both e-Catalog database system 13 (application 12) and the purchasing system 17 (application 15). The purchasing system 17 receives an initial download of purchasing contract, pricing and associated data 20 comprising data held in the e-catalog 13 database. Data 20 comprises records in Extensible Markup Language (XML) format that are conveyed using Internet File Transfer Protocol (FTP). In another embodiment data 20 may comprise records in other data formats conveyed in other protocols. Purchasing system 17 subsequently receives daily data updates 20 of pertinent e-catalog 13 database data that is changed or added.

System 31 manages the file transfer, scheduling, and execution of functions in e-Catalog database unit 13 and purchasing unit 17 in support of the price synchronization operation. The purchase database unit 17 includes application 15 for managing its operation and for its internal software maintenance. The unit 17 managing application 15 generates user interface menus for display supporting user interaction and commands. Thereby a user is able to override price updates received from e-Catalog 13 and is able to enter price, vendor and product information locally and independently of unit 13. Purchasing system 17 provides procurement database purchase history data 22 to e-catalog database system 13 and e-catalog unit 13 uses this history data in recalculating pricing and in identifying off contract purchases and incorrect pricing performed by unit 17. Unit 13 also uses the history data in performing contract compliance to identify discrepancies that may be corrected to ensure a purchase order is in compliance with supplier current purchasing contract terms. Data 22 comprises records in Extensible Markup Language (XML) format that are conveyed using Internet File Transfer Protocol (FTP). Alternatively other data formats and protocols may be used in communicating data 20 and 22.

System 31 synchronizes price, vendor, product and other information between the unit 13 and 17 databases once a Catalog file from the e-Catalog unit 13 is received and loaded into a set of cross reference (data mapping) tables in the unit 17 database. This synchronization is achieved by matching information items received from unit 13 with corresponding items in unit 17 using the mapping tables and replacing matched items with updated information. Where unit 13 provides new material that supplements information in the unit 17 database and there is no information item match, new record elements are created in the unit 17 database to contain the additional information items. Vendor records (i.e. records associated with particular Vendors) are manually matched before the information items contained within a particular vendor record are matched. In performing a manual vendor record match, a user compares particular fields to determine if a matching vendor is on file. These fields include, for example, Supplier Name, Electronic Data Interchange (EDI) Number, and Address. The EDI number and other items are defined within the December 1997 publication of the Data Interchange Standards Association (DISA) Accredited Standards Committee EDI Standard (ASC) X12 release 004010, (see http://www.x12.org/). Individual information elements within vendor records are synchronized (i.e. made the same) by updating information items in unit 17 with corresponding items received from unit 13 either by a System 31 Match (automated matching process) or a Manual match (involving user intervention).

In this embodiment, a user is informed (via a display menu generated by system 31) of an automatically matched record, i.e., a record provided by e-Catalog 13 associated with a particular vendor that is automatically matched to a corresponding record of the same particular vendor in the database of purchasing system 17. Automatic matching occurs upon receipt by purchasing system 17 of updated record information from e-Catalog 13. Further, the user is prompted to approve replacement of the vendor record price information items in unit 17 with the corresponding vendor record price information items received from e-Catalog 13 before update of the unit 17 database is implemented. A user is able to visually examine the existing record items and proposed replacement items to check validity of the update prior to accepting the change. System 31 matches e-Catalog 13 vendor record items with corresponding purchasing system 17 database items as the records and record items are loaded into a set of cross-reference tables within system 17. The cross-reference tables are used by system 31 to map information items from unit 13 to corresponding information items of unit 17. System 31 performs vendor record matching using predetermined criteria by comparing Supplier Part number and Manufacturer part number of the received e-Catalog 13 records against the purchasing system 17 database vendor part number and manufacturer part number. In addition, further record fields are compared in determining a match including Item Description, Generic Name, Manufacturer Name and Universal Product Number (UPN) Code.

System 31 also supports a manual vendor record matching function which is initiated upon user discretion and command. The manual matching function performs a match based on comparison of the same fields as described in the automatic matching function but provides a display of matched items for side by side user visual examination as well as for user comparison and acceptance. In addition, the system 31 manual match function supports comparison and matching of elements within vendor record information item description fields. For this purpose, system 31 searches for key fields within the description field based on user selected and entered data. A user is presented with a menu display giving side by side comparison of the item description and other fields of the e-Catalog 13 and purchasing system 17 vendor records. This enables a user to make a visual comparison and to accept or reject a record update. System 31 generates reports identifying records that are matched as well as records that have not been matched. System 31 also generates a report identifying any fields that are truncated in record information received from unit 13 or as a result of an update. In alternative embodiments, vendor records and record items may be matched on a wholly automatic basis without user intervention or on a semi-automatic basis involving user intervention in response to displayed prompts.

System 31 also updates purchasing system 17 using record data 20 received from e-Catalog 13 to accommodate other types of price adjustment, including special offers and time sensitive adjustments. Such updates may comprise incentives such as lower prices for say August or commission free sales or may comprise tax adjustments, for example. These types of price adjustments may be initiated in a contract management processor within e-Catalog system 13 or they may be initiated from within the Purchasing Database system 17. As previously described, price changes occurring in the e-Catalog system 13 are provided on an update file that is conveyed from the e-Catalog system 13 to the purchasing system 17 on a repetitive basis. The update may be provide intra-daily, daily, weekly or upon the number of required item updates meeting a predetermined threshold level, for example. Upon expiration of a price adjustment such as a special offer, a new price is provided to unit 17 in update data 20 from e-Catalog system 13. In an alternative embodiment and in a similar manner to that previously described, system 31 synchronizes price, product and vendor information derived from multiple e-catalog databases (not just the single e-Catalog database 13 described in the exemplary embodiment) with the purchasing system 17 information. However, in this case system 31 also reformats export files of price product and vendor information from such multiple e-catalog databases to be compatible with the import file requirements of purchasing system 17.

In the FIG. 1 arrangement, e-Catalog system 13 communicates with product suppliers 19 to obtain product, pricing, and contract terms and other information in EDI 832 format compatible records 29. The EDI 832 standard is an American National Standards Institute (ANSI) ASC X12 EDI standard providing for the electronic interchange of product price, sales and contract information. The EDI 832 records 29 are implemented in Extensible Markup Language (XML) and are conveyed using Internet File Transfer Protocol (FTP). Further, purchasing system 17 communicates purchase orders to product suppliers 19 using a variety of different formats which may include a conventional faxed purchase order or an EDI 850 format purchase order, for example. The EDI 850 standard is an American National Standards Institute (ANSI) ASC X12 EDI standard providing for the electronic interchange of purchase orders. The record formats and protocols described herein are exemplary only. In another embodiment different record formats may be used that provide the required information and transaction data interchange. In another embodiment communicated data 20, 22, 27 and 29 may comprise records and transaction data in other data formats such as Comma Separated Value (CSV) format or a fixed record file format or in HyperText Markup Language (HTML), Dynamic HTML (DHTML), Standardized Generalized Markup Language (SGML) or another format. Also, such records may be conveyed in other Internet compatible protocols such as HyperText Transfer Protocol (HTTP) or another protocol. Further, record items and transaction data 20, 22, 27 and 29 may be conveyed as individual items or may be conveyed in a file as a batch of data items.

Figure 2:
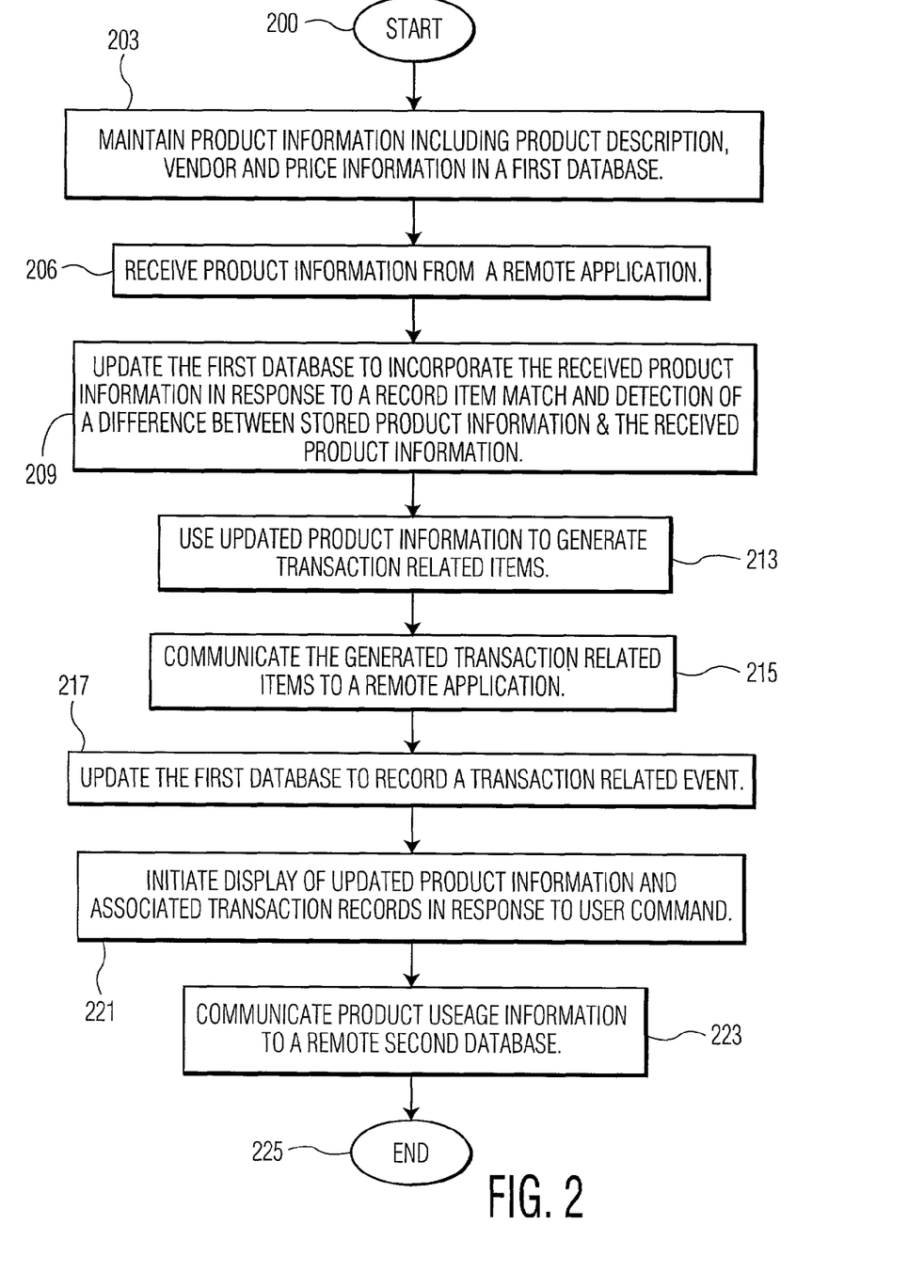
FIG. 2 shows a flowchart of a method used by a purchasing system for processing product information for supporting commercial transactions, according to invention principles.
Figure 4:
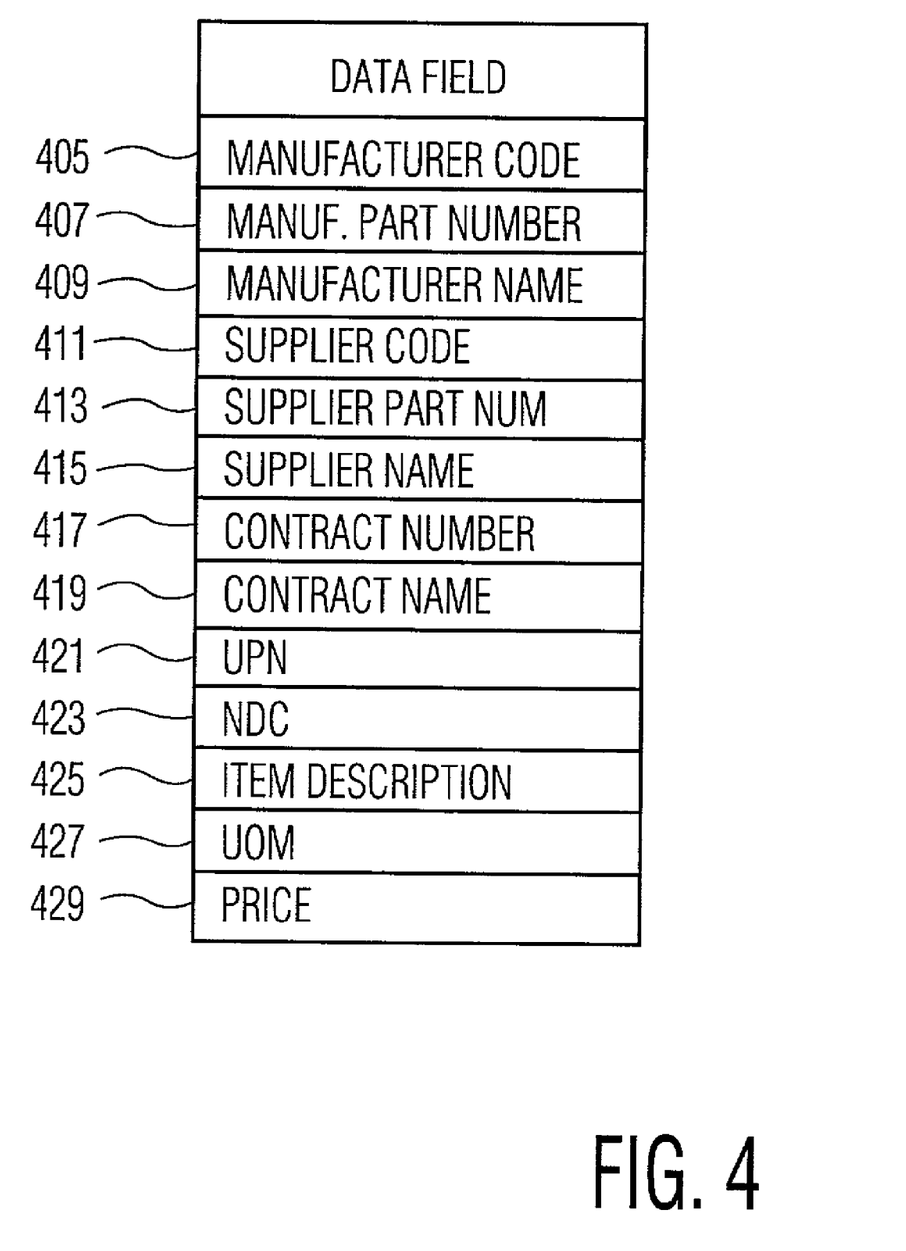
FIG. 4 shows a record for use by a catalog system in updating purchasing database system, according to invention principles.

FIG. 2 shows a flowchart of a method used by a system 31 application (application 15) and purchasing system 17 (FIG. 1) for processing product information for supporting commercial transactions. After initialization in step 200, application 15 maintains product information including product description, vendor and price information in a purchasing system 17 database (FIG. 1) in step 203 of FIG. 2. Application 15 in step 209 updates the unit 17 database with product information received in step 206 from e-Catalog 13. FIG. 4 shows an exemplary record for use by e-Catalog 13 in updating purchasing database system 17. Application 15 updates purchasing system 17 database information to incorporate received product information in response to detecting a match of record type and upon user record update approval. Such a match indicates that the unit 17 stored product information records and the received product information records from e-Catalog 13 concerns the same vendor and parts, for example. Application 15 also verifies there is a difference between unit 17 stored product information and the received product information records prior to updating the unit 17 data. In other embodiments, application 15 updates the unit 17 database on detection of just a record type match between unit 17 stored product information and the received product information. A difference between unit 17 stored product information and the received product information may comprise, for example, a difference in a product price, vendor, inventory, pricing structure or description information. Further, a difference in product pricing structure includes a difference in product price, in product volume pricing or a difference in projected future product price structure.

Application 15 detects matching records by matching elements between the unit 17 stored product information records and the received product information records. Specifically, application 15 identifies in the stored and received records a matching vendor and a matching information item in a record associated with the matched vendor. Application 15 updates the unit 17 database information to incorporate received product information in response to user update approval. In another embodiment however, application 15 may update the unit 17 database in response to approval that signifies a received product information item matches a corresponding item in the unit 17 database (i.e. update approval is on an item by item basis). Alternatively, in another embodiment application 15 updates the unit 17 database automatically upon detecting product matching information without user intervention.

Application 15 performs the match in step 209 in accordance with predetermined rules and creates a cross-reference file record indicating matched product information elements. Application 15 employs a hierarchically and sequentially organized process in matching unit 17 stored product information and the received product information. The matching process examines unit 17 cross-reference file information to determine whether an information item has been previously matched. If it has not, the process attempts to match product vendor followed by matching an information item in a record associated with the matched vendor. In matching a vendor in an e-Catalog 13 record exemplified in FIG. 4, for example, application 15 matches, in hierarchical order, supplier name 415 (FIG. 4), supplier part number 413, supplier code 411, manufacturer name 409, manufacturer part number 407 and manufacturer code 405. The predetermined match rules require at least two of these fields to be matched to declare a vendor match. Other fields not shown in FIG. 4 that may be used for vendor matching in another embodiment include, substitute manufacturing part number, manufacturer division, or a manufacturer license code. If the unit 17 cross-reference file information indicates a particular vendor record is already matched to an indicated record, the described vendor record match process is bypassed.

In matching a product item in an e-Catalog 13 record exemplified in FIG. 4, application 15 matches, in hierarchical order, supplier part number 413 (FIG. 4), manufacturer part number 407, elements within item description 425 and Universal Product Number (UPN) code 421. The predetermined match rules require at least two of these fields to be matched to declare a product item match. Other fields that may be used for product item matching in another embodiment include, manufacturing name 409 and manufacturer division (not shown in FIG. 4). Other embodiments may use different matching rules involving different matching criteria and different record fields to match either a vendor or a product item associated with a vendor. Such other embodiments may involve contract name 419, contract number 417 and National Drug Code (NDC) 423. Alternative matching rules may employ probabilistic matching involving giving a match weighting indicative of probability of a match of particular record fields. Upon completion of a match and user approval of a price update, application 15 in step 209 of FIG. 2 updates the purchasing system 17 database to include an updated price and corresponding unit of measure (items 429 and 427 of FIG. 4). Thereby application 15 synchronizes product information in the purchasing system 17 database with corresponding product information in the remote database of e-Catalog system 13. Application 15 also updates the cross-reference file record previously created in step 209 to indicate the particular product information elements that were matched.

In step 213 purchasing system 17 uses the updated product information in generating transaction related documentation and messages for communication to a remote application in step 215. Specifically, purchasing system 17 uses the updated product information to generate a purchase order (item 27 of FIG. 1) for communication in step 215 to a remote application employed by suppliers (unit 19 of FIG. 1). The purchase order is communicated to the remote supplier application by Internet compatible communication but may alternatively be communicated by other forms of electronic or non-electronic communication such as Fax or mail, for example. Alternatively (or additionally), purchasing system 17 generates other transaction related documentation and messages for communication to a remote application such as a product technical specification, an invoice, an advance shipment notice, an acknowledgement of receipt of a purchase related document, and a purchase order history report. The transaction related documentation generated by purchasing system 17 is compatible with Electronic Data Interchange (EDI) formats determined by the Accredited Standards Committee EDI Standard (ASC) X12 release 004010, (see http://www.x12.org/). Exemplary EDI formats that may be employed comprise, Invoice (EDI 810), Payment (EDI 820), (Vendor) Technical Specifications (EDI 841), Purchase Order (EDI 850), Purchase Order Acknowledgement (EDI 855), Advance Ship Notice (EDI 856) and Functional Acknowledgement (EDI 997). In other embodiments, alternative formats, including company proprietary formats may also be used to support communication of transaction related documentation. Further, purchasing system 17 in step 217 (FIG. 2) updates an internal transaction monitoring database to indicate the generation, communication and receipt of transaction related documentation. For example, purchasing system 17 updates the system 17 transaction monitoring database to indicate receipt of a purchase order acknowledgement or the making of a payment to a supplier.

Purchasing system 17 in step 221 initiates display of updated product information and associated transaction records in response to user command. Further, in step 223, application 15 communicates product usage information comprising product purchase history data (item 22 of FIG. 1) to e-Catalog system 13 (FIG. 1). The product usage information communicated to e-Catalog system 13 by application may also include product sales data, product parts list data or product transaction related data. The process of FIG. 2 ends at step 225.

Figure 3:
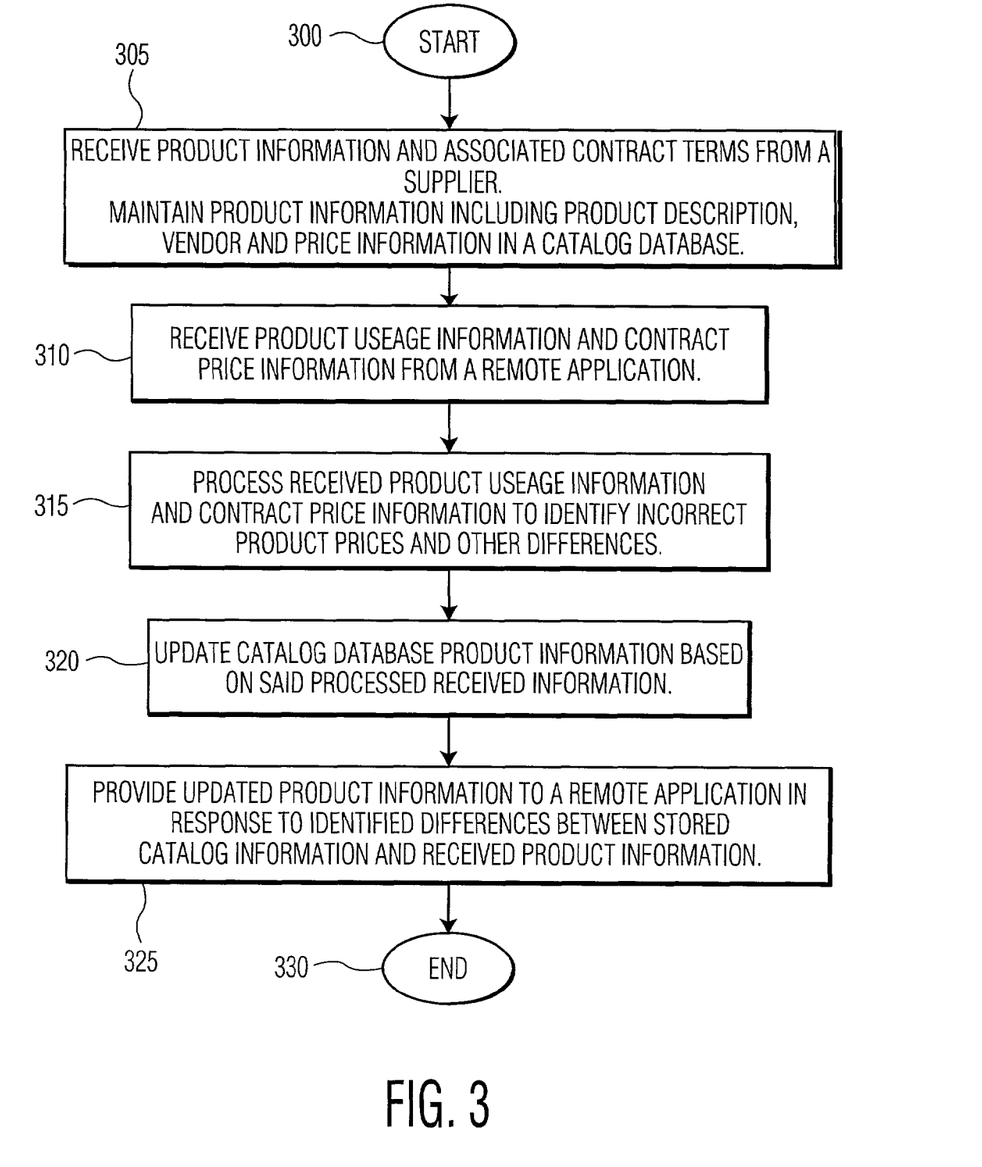
FIG. 3 shows a flowchart of a method used by a catalog database system for processing product information for supporting commercial transactions, according to invention principles.

FIG. 3 shows a flowchart of a method used by application 12 (FIG. 1) of e-Catalog system 13 for processing product information for supporting commercial transactions. After initialization in step 300, application 12 maintains product information including product description, vendor and price information in an e-Catalog system 13 database (FIG. 1) in step 305 of FIG. 3. Application 12 receives product information including price and associated contract information from multiple suppliers (e.g., suppliers 19 of FIG. 1) for maintaining the system 13 internal product information database. For this purpose, Price and Sales catalog records 29 are intermittently transferred to e-Catalog 13 from suppliers 19 (FIG. 1) using Extensible Markup Language (XML) format and Internet compatible File Transfer Protocol (FTP). This is done in response to data requests from e-Catalog 13 to suppliers 19 or at the initiative of suppliers 19 upon accumulating information suitable for transfer to unit 13. The transferred records use an Electronic Data Interchange (EDI) structure compatible with an EDI 832 standard providing for the electronic interchange of product price, sales and contract information (see Accredited Standards Committee EDI Standard (ASC) X12 release 004010 and http://www.x12.org/). In other embodiments other record formats may alternatively be used.

Figure 5:
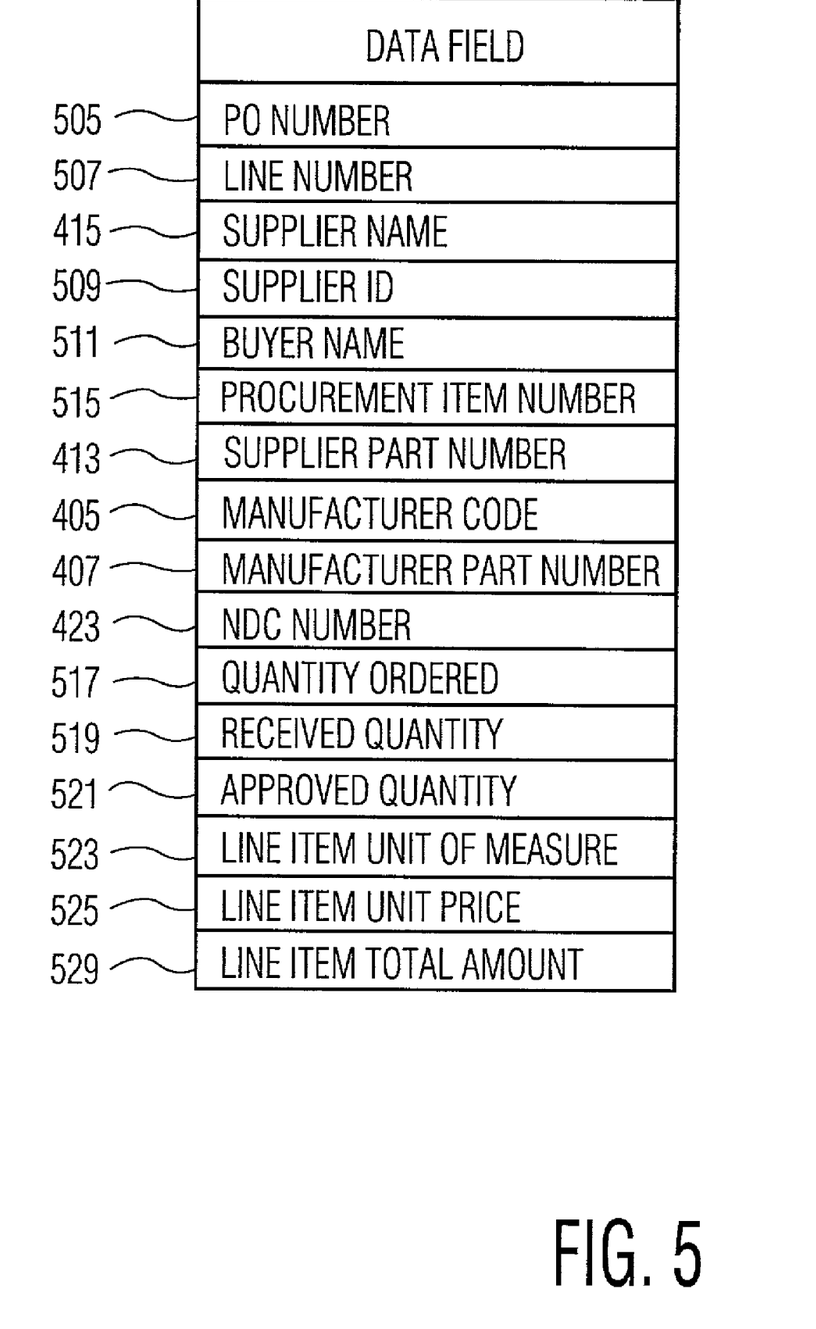
FIG. 5 shows a record for use by purchasing database system in updating a catalog system, according to invention principles.

Application 12 in step 310 receives from purchasing system 17, via records 22 (FIG. 1), product usage information comprising product purchase history data, product sales data, product parts list data or product transaction related data. FIG. 5 shows a record (22 of FIG. 1) for use by purchasing system 17 in updating e-Catalog system 13 with product usage information. Application 12 in step 315 processes the received product usage information to identify incorrect product prices, recalculate purchase pricing of products in the product usage information, identify purchase contractual discrepancies, and identify items not covered by a purchase contract. The record information of FIG. 5 includes information items 505-529 supporting the processing of step 315. Specifically, the FIG. 5 record includes Purchase Order identification number 505, supplier name 415, buyer name 511, manufacturer code 405, quantity related information items 517-521, price 525 and other items, for example.

Application 12 in step 320 updates product information in the e-Catalog system 13 database based on the received product usage information. The product usage information 22 enables e-Catalog system 13 to regularly synchronize its catalog of product items and associated pricing with the purchasing system 17 database of products and pricing. E-Catalog system 13 uses product usage information to recalculate item price information provided to purchasing system 17 based on prior product purchases. Prices obtainable by system 17 may reduce if volume discount levels are reached because of previously ordered volumes, for example. Consequently users are able to order supplies via purchasing system 17 with accurate contract price information regularly supplied by e-Catalog system 13. The product usage information received by e-Catalog system 13 also allows e-Catalog system 13 to perform a contract compliance analysis on previously purchased products and to ensure product pricing and contractual information provided to purchasing system 17 accords with typical previous requirements. Thereby e-Catalog system 13 is able to validate pricing received by purchasing system 17 and to inform purchasing system 17 of contract variances and price discrepancies and supports monitoring of contract compliance. As a result purchasing system 17 is able to effectively manage contracts, place accurately priced purchase orders, accelerate re-capture of overpayments, correct contractual irregularities and identify accounting errors.

In step 325 of FIG. 3, application 12 verifies there is a difference between the product information stored in the e-Catalog 13 database and the product information previously provided to purchasing system 17. In response to this verification, application 12 communicates updated product information to purchasing system 17 (FIG. 1). The process of FIG. 3 ends at step 330.

The processes of FIGS. 2 and 3 and record formats of FIGS. 4 and 5 as well as the architecture of the system of FIG. 1 are not exclusive. Other architectures, processes, protocols and record formats may be derived in accordance with the principles of the invention to accomplish the same objectives. The inventive principles may be applied in a variety of environments for synchronizing product information including price, vendor and product description between different databases remotely located with respect to one another. Further different protocols and file formats may be used to support the communications and transactions involved. The described use of FTP protocol and XML and EDI compatible formats is exemplary only.

What is claimed is:

1. A system for processing product information for supporting commercial transactions, comprising:
   a first database for maintaining product information including product description, product vendor and associated vendor product pricing information;
   a data processor for receiving product information and for updating said first database information to incorporate received product information including product sales data and contract sales terms of a vendor in response to detection of matching records between said received product information and said first database information; and
   an interface processor for communicating updated product price information to a system derived based on said product sales data and contract sales terms of said vendor in response to user command.

2. A system according to claim 1, wherein
said data processor recalculates purchase pricing of products using said product sales data and detects matching records by matching elements between said received product information and said first database information comprising (a) a matching vendor and (b) a matching information item in a record associated with said matched vendor.

3. A system according to claim 2, wherein
said data processor recalculates purchase pricing of products using said contract sales terms and updates said first database information to incorporate received product information in response to manual user data entry of at least one of (a) update approval, (b) product matching information and (c) approval identifying a received product information item matches a corresponding item in said first database.

4. A system for processing product information for supporting commercial transactions, comprising:
   a first database for maintaining product information including product description, product vendor and associated vendor product pricing information;
   a data processor for receiving product information and for updating said first database information to incorporate received product information including product sales data and contract sales terms of a vendor and recalculates purchase pricing of products using said product sales data and contract sales terms in response to detection of a difference between stored product information and said received product information; and
   an interface processor for communicating updated product price information to a system derived based op said product sales data and contract sales terms of said vendor in response to user command.

5. A system according to claim 4, wherein
said data processor uses updated product information to generate an item of at least one of, (a) a purchase order, (b) a product technical specification, (c) an invoice, (d) an advance shipment notice, (e) an acknowledgement of receipt of a purchase related document, and (f) a purchase order history report, and
said system communicates said generated item to a remote application.

6. A system according to claim 4, wherein
said data processor processes said received product information to at least one of, (a) identify incorrect product prices, (b) identify purchase contractual discrepancies, and (c) identify items not covered by a purchase contract.

7. A system according to claim 4, wherein
said data processor updates said first database information to incorporate received product information in response to a difference between stored product information and said received product information comprising at least one of, (a) a difference in a product price information, (b) a difference in a product vendor information, (c) a difference in product inventory, (d) a difference in product pricing structure and (e) a difference in product description information.

8. A system according to claim 7, wherein
said difference in product pricing structure comprises at least one of, (i) a difference in product price, (ii) a difference in product volume pricing and (iii) a difference in projected future product price structure.

9. A system according to claim 4, wherein
said system includes a bidirectional communication network, and
said data processor receives product information from a remote second database in response to communicating product usage information to said remote second database using said bidirectional communication network.

10. A system according to claim 4, wherein
said received product information includes product usage information comprising at least one of (a) product purchase history data, (b) product parts list data and (c) product transaction related data.

11. A system according to claim 4, wherein
said received product information is derived from an Internet compatible second database comprising an electronic catalog of vendor product information and
said system includes a bidirectional communication network for acquiring product information from said catalog using Internet compatible communication protocol.

12. A system according to claim 4, wherein
said system includes a bidirectional communication network, and
said data processor receives product information from a remote second database in response to communicating product usage information to said remote second database using said bidirectional communication network.

13. A system according to claim 4, wherein said data processor matches records between said received product information and said first database information by matching (a) corresponding part numbers, (b) corresponding item descriptions, (c) corresponding product names and (d) corresponding UPN codes.

14. A system according to claim 4, wherein
said data processor automatically synchronizes product information in said first database with corresponding product information in a remote second database by updating product information in said first database to match corresponding product information in said second database in response to at least one of, (a) detection of a difference between product information in said first database and said second database and (b) periodic update initiation.

15. A system according to claim 4, wherein
said data processor synchronizes product information in said first database with corresponding product information in a remote second database by updating product information in said first database to match corresponding product information in said second database in response to manual user data entry of at least one of (a) update approval, (b) product matching information and (c) approval identifying a received product information item matches a corresponding item in said first database.

16. A system for processing product information for supporting commercial transactions, comprising:
a bidirectional communication processor supporting communication with a remote application;
a first database for maintaining product information including product description, product vendor and associated vendor product pricing information; and
an update processor for communicating product usage information including product sales data and contract sales terms of a vendor to a remote application employing a second database of product information, and for updating product price information in said first database with corresponding acquired product information derived from product sales data and contract sales terms in said remote second database using said communication processor in response to detection of a difference between product information in said first database and said second database.

17. A system according to claim 16, wherein
said product usage information comprises at least one of (a) product purchase history data, (b) product parts list data and (c) product transaction related data.

18. A system according to claim 16, wherein
said update processor stores said acquired product information from said remote second database in a mapping table and uses said mapping table in matching items in said acquired product information with corresponding items in said first database product information.

19. A system according to claim 16, wherein
said update processor matches product information in said first database with corresponding acquired product information derived from said remote second database by matching, (a) corresponding part numbers, (b) corresponding item descriptions, (c) corresponding product names and (d) corresponding UPN codes.

20. A system according to claim 16, wherein
said update processor recalculates purchase pricing of products using said product sales data and contract sales terms and updates said first database.

21. A system for maintaining and processing a catalog of product information for supporting commercial transactions, comprising:
a bidirectional communication processor supporting communication with a remote application;
a catalog database for maintaining product information including product description, product vendor and associated vendor product pricing information; and
a catalog data processor employing said communication processor in, receiving product usage information including product sales data and contract sales terms of a vendor from a remote application, identifying differences between data in said received product usage information and said catalog database product information, and communicating product price information to said remote application derived based on said product sales data and contract sales terms of said vendor in response to said identified differences.

22. A system according to claim 21, wherein
said product usage information comprises at least one of (a) product purchase history data, (b) product parts list data and (c) product transaction related data.

23. A system according to claim 21, wherein
said catalog data processor receives from a product vendor at least one of (a) product information, and (b) contract term information associated with said product information.

24. A system according to claim 21, wherein
said catalog data processor processes said received product usage information to at least one of, (a) identify incorrect product prices, (b) to recalculate purchase pricing of products in said product usage information, (c) identify purchase contractual discrepancies, and (d) identify items not covered by a purchase contract.

25. A system according to claim 21, wherein
said catalog data processor recalculates purchase pricing of products using said product sales data and contract sales terms in providing updated product information for communication to said remote application in response to said identified differences.

* * * * *